US010250385B2

(12) United States Patent
Papadopoulos et al.

(10) Patent No.: US 10,250,385 B2
(45) Date of Patent: Apr. 2, 2019

(54) CUSTOMER CALL LOGGING DATA PRIVACY IN CLOUD INFRASTRUCTURE

(71) Applicant: Cloud9 Technologies, LLC, New York, NY (US)

(72) Inventors: Leonidas P Papadopoulos, Ridgefield, CT (US); Roger Norman Dunn, Stratham, NH (US); Anil Mathai Varghese, Jersey City, NJ (US)

(73) Assignee: Cloud9 Technologies, LLC, New York, NY (US)

( * ) Notice: Subject to any disclaimer, the term of this patent is extended or adjusted under 35 U.S.C. 154(b) by 264 days.

(21) Appl. No.: 15/179,727

(22) Filed: Jun. 10, 2016

(65) Prior Publication Data

US 2017/0244693 A1     Aug. 24, 2017

Related U.S. Application Data

(60) Provisional application No. 62/297,105, filed on Feb. 18, 2016.

(51) Int. Cl.
*H04L 29/06* (2006.01)
*H04L 9/08* (2006.01)

(52) U.S. Cl.
CPC ............ *H04L 9/0861* (2013.01); *H04L 9/088* (2013.01); *H04L 9/0894* (2013.01); *H04L 63/0442* (2013.01); *H04L 63/061* (2013.01); *H04L 2463/062* (2013.01)

(58) Field of Classification Search
CPC .................................................. H04L 63/083
See application file for complete search history.

(56) References Cited

U.S. PATENT DOCUMENTS

| | | | | |
|---|---|---|---|---|
| 6,470,085 | B1 * | 10/2002 | Uranaka | G06F 21/10 380/231 |
| 6,898,288 | B2 * | 5/2005 | Chui | H04K 1/00 380/278 |
| 7,996,914 | B2 * | 8/2011 | Hirota | G06F 21/10 713/172 |

(Continued)

FOREIGN PATENT DOCUMENTS

| CN | 104735070 A | * | 6/2015 |
|---|---|---|---|
| CN | 104796411 A | * | 7/2015 |
| JP | 2015104020 A | * | 6/2015 |

OTHER PUBLICATIONS

Kim et al., "Secret key terminal apparatus with function of managing secret key and method for managing secret key, especially for registering secret key on multi server safely by having only identification and password" KR2005104220A/KR 617456B1 (Year: 2004).*

*Primary Examiner* — Shawnchoy Rahman
(74) *Attorney, Agent, or Firm* — FisherBroyles LLP; Richard M. Lehrer

(57) ABSTRACT

Systems and methods are provided for encrypting data at a customer for storage at a hosted service provider. In addition to the data being encrypted by the client, the secret encryption key used to encrypt the data is also encrypted. Both the encrypted data and the encrypted secret encryption key are transmitted to the service provider who may further encrypt the data with another encryption key and who stores the further encrypted data, the encrypted secret encryption key and the another encryption key.

20 Claims, 9 Drawing Sheets

(56) References Cited

U.S. PATENT DOCUMENTS

| | | | | |
|---|---|---|---|---|
| 8,954,740 | B1* | 2/2015 | Moscaritolo | H04L 63/065 |
| | | | | 380/277 |
| 9,673,975 | B1* | 6/2017 | Machani | H04L 9/0822 |
| 9,893,883 | B1* | 2/2018 | Chaubey | H04L 9/0841 |
| 2002/0049908 | A1* | 4/2002 | Shimosato | G06Q 20/341 |
| | | | | 713/186 |
| 2005/0138360 | A1* | 6/2005 | Kamalakantha | G06F 21/606 |
| | | | | 713/156 |
| 2006/0093150 | A1* | 5/2006 | Reddy | H04L 9/0825 |
| | | | | 380/282 |
| 2006/0126848 | A1* | 6/2006 | Park | H04L 9/3271 |
| | | | | 380/277 |
| 2006/0282674 | A1* | 12/2006 | Saito | G06T 1/0071 |
| | | | | 713/176 |
| 2009/0106561 | A1* | 4/2009 | Ejiri | G06F 21/62 |
| | | | | 713/193 |
| 2012/0088584 | A1* | 4/2012 | Mamtani | H04N 21/233 |
| | | | | 463/42 |
| 2013/0111205 | A1* | 5/2013 | Biswas | H04L 63/0428 |
| | | | | 713/153 |
| 2013/0182842 | A1* | 7/2013 | Fasoli | H04N 21/2347 |
| | | | | 380/255 |
| 2014/0095878 | A1* | 4/2014 | Shimano | H04L 9/0897 |
| | | | | 713/171 |
| 2015/0371052 | A1* | 12/2015 | Lepeshenkov | H04L 63/06 |
| | | | | 713/165 |
| 2016/0359822 | A1* | 12/2016 | Rivera | H04L 63/061 |

\* cited by examiner

CUSTOMER CALL LOGGING DATA PRIVACY IN CLOUD INFRASTRUCTURE

FIELD OF THE INVENTION

The technology of this application relates generally to network based communications, and more specifically but not exclusively to encrypting customer data for transmission and storage on an unsecure network.

BACKGROUND OF THE INVENTION

Third party service providers of network services often store and manage customer data which is accessible over a network. A problem with such a configuration is that the content of the data, which may be sensitive, may also be accessible to the third party provider. In other words, an employee with sufficient rights or a hacker who gains unauthorized access to the service provider may gain access to the content of this data. Alternatively, the data may be the subject of, or relevant to a litigation in which case the service provider could be subpoenaed for the data. Each of these scenarios causes additional workload and responsibility for the service provider and concern for customers.

It would thus be advantageous to provide systems and methods which enable the customer to store the data with the service provider while restricting access to the content of the data to all but the customer. It would also be advantageous to encrypt the data and provide the tools for decrypting the data only to the customer and/or to someone whom the customer selects.

BRIEF SUMMARY OF THE INVENTION

Many advantages will be determined and are attained by the technology of the present application, which in a broad sense provides systems and methods for securing access to data stored by a third party service provider.

One or more embodiments of the technology provide(s) a system for secure storage of customer data by a remote service provider equipment (SPE). The system includes a processor based customer premise equipment (CPE) which has an application programming interface (API) and a key manager. The CPE is configured to generate a secret encryption key. The key manager is configured to provide a master encryption key to the API for encrypting the secret encryption key. The CPE is also configured to generate data, and encrypt the data with the secret encryption key, to encrypt the secret encryption key with the master encryption key and to transmit the encrypted data and the encrypted secret encryption key for receipt and storage by the service provider.

One or more embodiments of the technology provide(s) a method for storing customer data at a remote service provider. The method includes a customer accessing via a processor based device a service provided by the service provider. The customer generates data as a result of the access and the processor based device generates a secret encryption key. The processor based device encrypts the data with the secret encryption key and transmits the encrypted data for receipt by the service provider. The processor based device encrypts the secret encryption key with a master encryption key and transmits the encrypted secret encryption key for receipt by the service provider.

One or more embodiments of the technology provide(s) a method for storing at a service provider customer data. The method includes the service provider receiving an encrypted secret encryption key and encrypted data from a processor based customer equipment running an application provided by the service provider. The data is encrypted with the secret encryption key. The service provider further encrypts the encrypted data and stores the further encrypted data in a storage device. The service provider further encrypts the encrypted secret encryption key.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the invention, reference is made to the following description, taken in conjunction with the accompanying drawings, in which like reference characters refer to like parts throughout, and in which.

Figure 1:
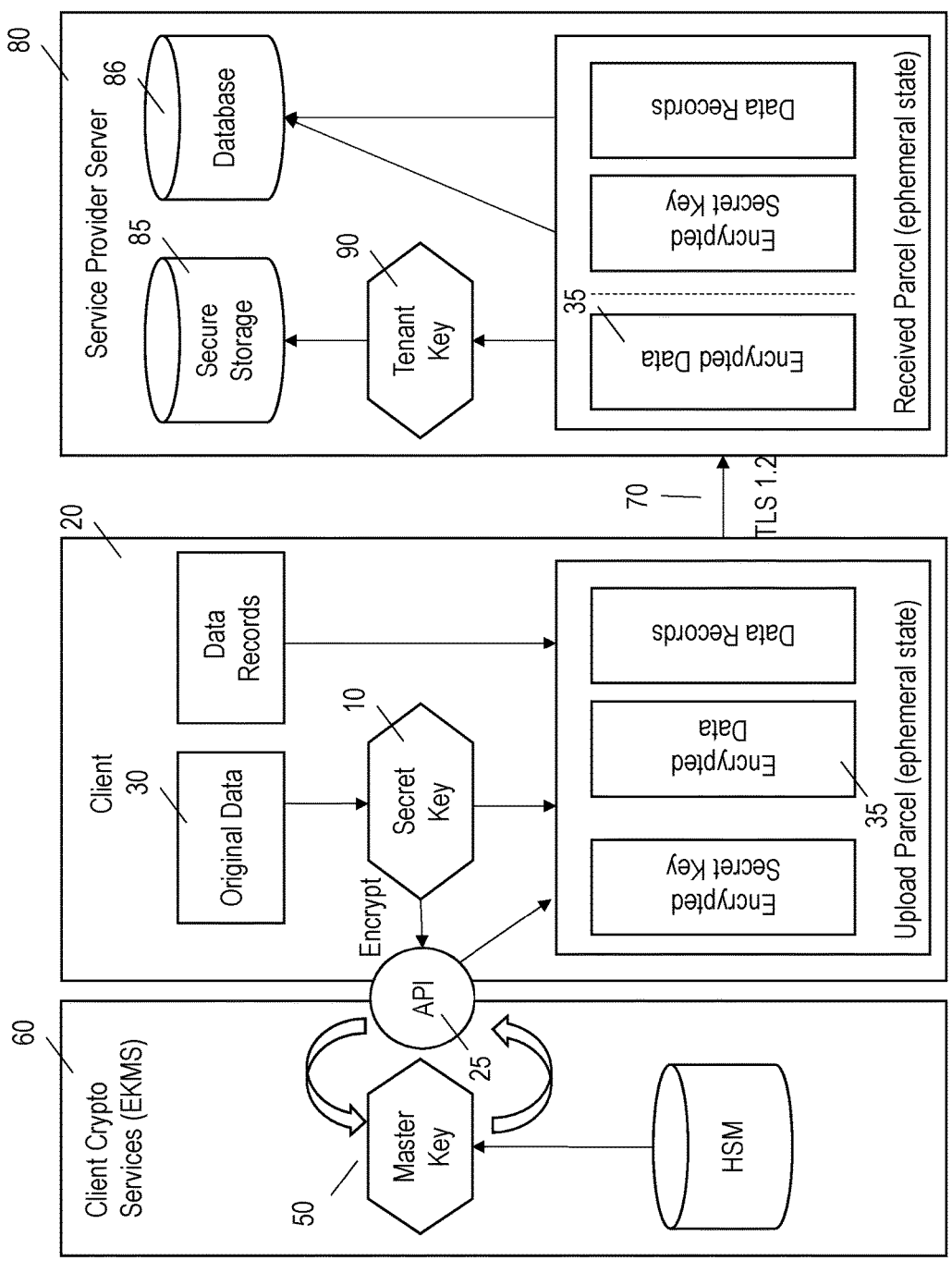
FIG. 1 illustrates an exemplary system architecture diagram for encrypting data according to the technology of the present application.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the figures in detail wherein like reference numerals identify like elements throughout the various figures, there is illustrated in FIGS. 1-9 systems and methods for limiting access to the content of customer data which is stored offsite by a third party service provider. The following description will be limited to call logging information related to communications in the financial industry. However, those skilled in the art will recognize that the systems and methods could be employed by other services and other industries as well and is thus not so limited.

The following description is provided as an enabling teaching as it is best, currently known. To this end, those skilled in the relevant art will recognize and appreciate that many changes can be made to the various aspects described herein, while still obtaining the beneficial results of the technology disclosed. It will also be apparent that some of the desired benefits can be obtained by selecting some of the features while not utilizing others. Accordingly, those with ordinary skill in the art will recognize that many modifications and adaptations are possible, and may even be desirable in certain circumstances, and are deemed a part of the technology described and claimed. Thus, the following description is provided as illustrative of the principles of the technology and not in limitation thereof. Discussion of an embodiment, one or more embodiments, an aspect, one or more aspects, a feature or one or more features is intended be inclusive of both the singular and the plural depending upon which provides the broadest scope without running afoul of the existing art and any such statement is in no way intended to be any more limiting in nature. Technology described in relation to one of these terms is not necessarily limited to use in that particular embodiment, aspect or feature and may be employed with other embodiments, aspects and/or features where appropriate. Additionally, technology described in relationship to an embodiment, feature, aspect or one or more embodiments/features/aspects does not necessarily require nor does it necessarily preclude that technology from being included in every possible aspect, feature or embodiment of the invention.

One or more embodiments of the described technology provides for encryption of data that will be stored at a remote location and decryption of the data when it is retrieved from the remote location. The technology is realized using an application running on a local computer which receives data as a result of the application being used and encrypts the data and communicates the encrypted data to the remote storage location. A download tool, which may be included in the application or may be a separate application running on the same local computer and/or a different computer under the control of a user who is authorized to access the content of the data obtains encrypted data from the remote storage location and decrypts the same.

Figure 2:
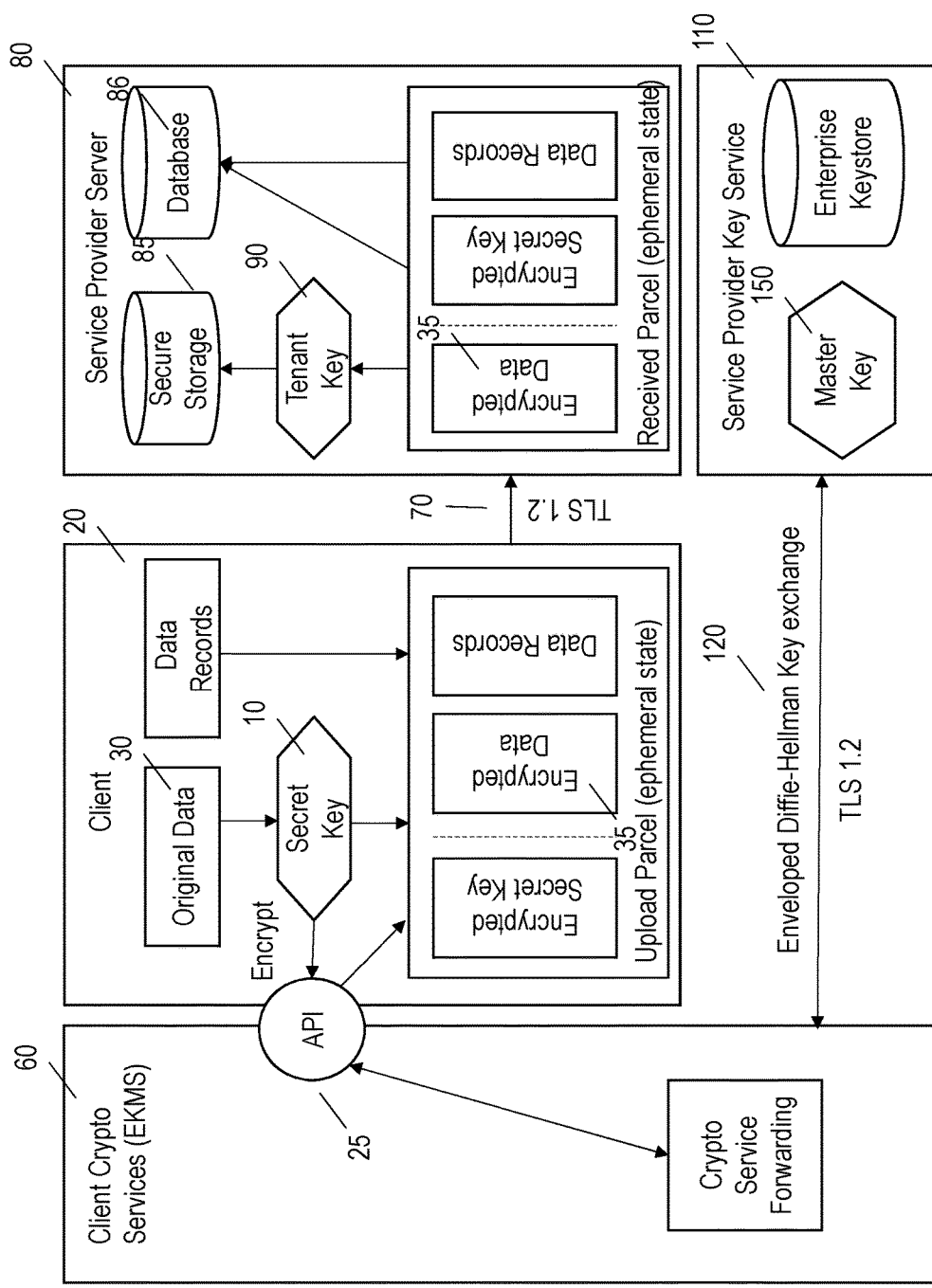
FIG. 2 illustrates an alternate exemplary system architecture diagram for encrypting data according to the technology of the present application.

FIG. 1 illustrates an architecture of an exemplary system setup for employing the technology of the application. Some benefits of the illustrated system are that the customer data is always in an encrypted state when outside of the client environment; unencrypted keys are not stored in proximity to encrypted data; and transport between client and server endpoints is over secure channels (although as one skilled in the art will recognize, with the various levels of encryption a secured channel is merely a design choice and is not required). As illustrated in FIG. 1, a secret encryption key 10 is generated at the client 20 for each voice recording (or other data) 30 and used to encrypt 40 that voice recording 30 before it leaves the client 20. The secret encryption key 10 is also encrypted after it is used to encrypt the data so that the secret encryption key 10 cannot be used to decipher the voice recording 30 outside of the client premises. The secret encryption key 10 is encrypted with a client-specific master key 50 which is either applied with on-premises enterprise key management system (EKMS) 60 or applied using a third party (preferably the service provider's, but not required to be) secure key service 110 (FIG. 2). The communication channel 70 between the client 20 and the service provider server 80 is authenticated and encrypted (although once again this is not a requirement due to the various levels of encryption). On the service provider side, a tenant key 90 such as, but not limited to one derived from Amazon Web Services (AWS) Key Management Services (KMS) is used to further encrypt the encrypted voice recording 35, ensuring that the voice recording 30 is completely secure at rest in an AWS S3 storage 85 (or some other secure storage). Those skilled in the art will recognize that other KMS's and secure storage facilities may be employed without departing from a scope of one or more of the claims. With the above configuration, an unauthorized user or program wishing to decipher an at-rest voice recording would have to successfully attack 3 separate, highly secure infrastructures: (1) obtain unauthorized access to AWS KMS to obtain the tenant key 90; (2) obtain unauthorized access to the database 86 in the service provider's AWS virtual private cloud to obtain the encrypted secret key 40; and (3) obtain unauthorized access to the client-side key management infrastructure 60 to obtain the master key 50.

As illustrated, the system illustrated in FIG. 1 includes a service provider 80 (in this case Cloud9) who provides hosted subscription based services. The service provider 80 which includes at least one server which has access to secure storage 85 for storing the encrypted data 35 and separate storage 86 for storing tenant encryption keys and data records (e.g. metadata that is used for retrieving specific encrypted data?). This storage 86 may be located on the service provider's premises and/or at some other location. The customer 20 includes, among other standard customer equipment, an EKMS 60 for encrypting the secret encryption key 10, an application programming interface (API) 25 and a client side of the service provider application. The API defines the call mechanism by which client-side secret keys are encrypted and decrypted. While FIG. 1 illustrates a single service provider 80, with two databases 85 and 86 and a single customer 20 with a single API 25 and a single EKMS 60, those skilled in the art will recognize that this is merely for ease of description and the technology is not so limited. There may be multiple customers 20 each with one or more APIs 25 and one or more EKMS's 60. Additionally, under one or more configurations customers 20 may share one or more EKMS's 60 and or API's 25 (e.g. a parent and a wholly owned subsidiary, or different departments of the same customer may have separate accounts). The encrypted secret keys 10 are stored in the service provider's server infrastructure 80, and may be subject to a full backup and digital rights management (DRM).

The API 25 may be terminated at the service provider's server(s) 80 or at the client side 20 of the application. For organizations that have a robust internal EKMS 60, the API 25 would be a Web service invocation (or similar) by which the secret encryption key 10 is encrypted with a client-specific master key 50. Alternatively, if the organization is lacking EKMS 60, the API 25 can be implemented with the service provider's Key Service 110, using a secondary tenant key (also referred to as a Master Key) 150, and enveloped Diffie-Hellman key exchange 120 to ensure the security of the secret encryption key 10 as it is encrypted. In either API scenario, the system assures that the client 20 has access to cryptographic services 60/110 such that the voice recording 30 can be decrypted irrespective of the location from which the client logs in. Each customer 20 that requires recording encryption will have a tenant key 90 in the service provider 80 using AWS KMS or a similar service. This tenant key 90 will be rotated on a regular basis (e.g. quarterly, more often or less often) or on some other basis (e.g. randomly, semi-randomly) although a system that does not rotate the tenant key, while not preferred, will still fall within a scope of one or more of the claims.

FIG. 2 illustrates a system configuration in which the customer does not have its own EKMS 60. In the system configuration of FIG. 2, the customer has the secret encryption key 10 encrypted by a third party encryption service 110 such as Amazon or the service provider may obtain the encryption service for the customer. Either way, the EKMS 100/110 is physically distinct from and otherwise unrelated to the service provider's server.

Data encryption techniques are old and well defined and thus shall not be further described herein. The following description of the technology will be limited to hosted communications between financial institutions, but the technology is not so limited. Those skilled in the art will recognize this description is applicable to any hosted service wherein the host/service provide may have access to sensitive data.

Figure 5:
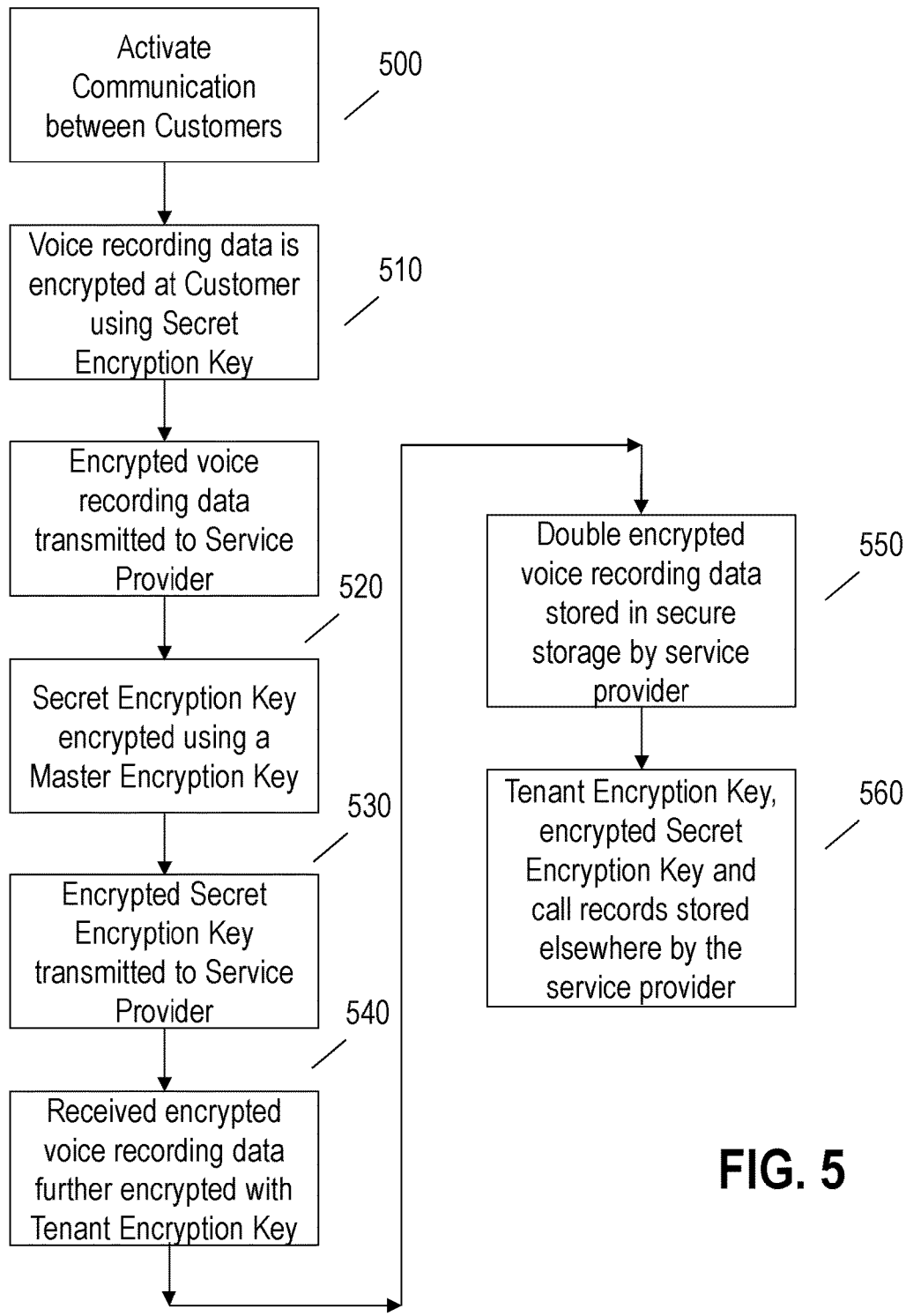
FIG. 5 illustrates a flowchart of an exemplary method of encrypting data in accordance with the technology of the present application.

FIG. 5 provides a general flow chart illustrating an exemplary method for realizing the technology of the present invention. As illustrated, a communication path is established 500 between customers via the hosted subscription service. When 2 or more customers communicate a call log is created at the customer. The call log may include information such as voice recordings, participant identities, IP addresses, documents shared during the communication, time and date stamp, etc. For ease of explanation, the following description will be limited to voice recordings and metadata associated with the voice recordings, but those skilled in the art will recognize that the description is equally applicable to any log information alone or in combination or to data other than call log information. Uploading a voice recording is performed by generating a secret encryption key which is only known to the client. The original voice recording is encrypted with the secret encryption key 510 (e.g. using AES256 Galois/Counter Mode (GCM) or a similar encryption); and an API is invoked to encrypt the secret encryption key with a client-specific master key 530 (e.g. again using AES256 GCM or a similar encryption). For on-premises EKMS, the master key remains in the client environment; for service provider or third party provider Key Service, the master key remains at the provider's secure environment. The encrypted voice recording, encrypted encryption key and metadata are sent over a TSL 1.2-mediated connection to the service provider (e.g. Cloud9) server 520, 540. Those skilled in the art will recognize that one or more of these items may be transmitted together or separately, and the order in which they are transmitted is a design choice. The received encrypted voice recording is further encrypted by the service provider with a tenant key (customer specific key) 550 and stored in an AWS S3 storage (or some other secure storage) 560 and the metadata, encrypted secret encryption key and tenant key are stored in a database in the service provider's virtual private cloud (or at some other storage that is separate and apart from the secure storage where the multi-encrypted voice recording is stored). Those skilled in the art will recognize that one or more of the metadata, encrypted secret encryption key and tenant key may be stored together or separate and still fall within a scope of one or more claims.

Figure 3:
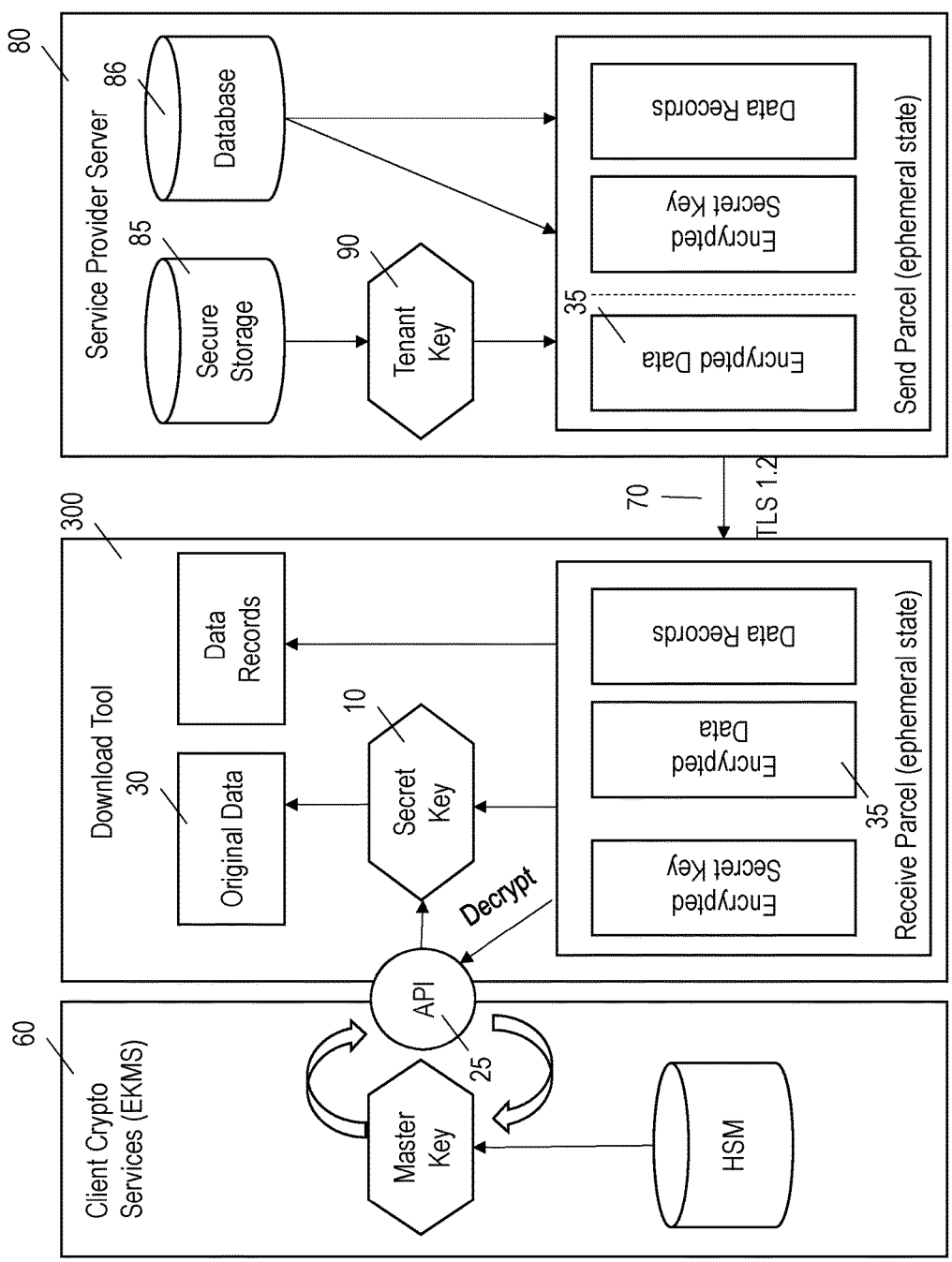
FIG. 3 illustrates an exemplary system architecture diagram for decrypting data according to the technology of the present application.
Figure 4:
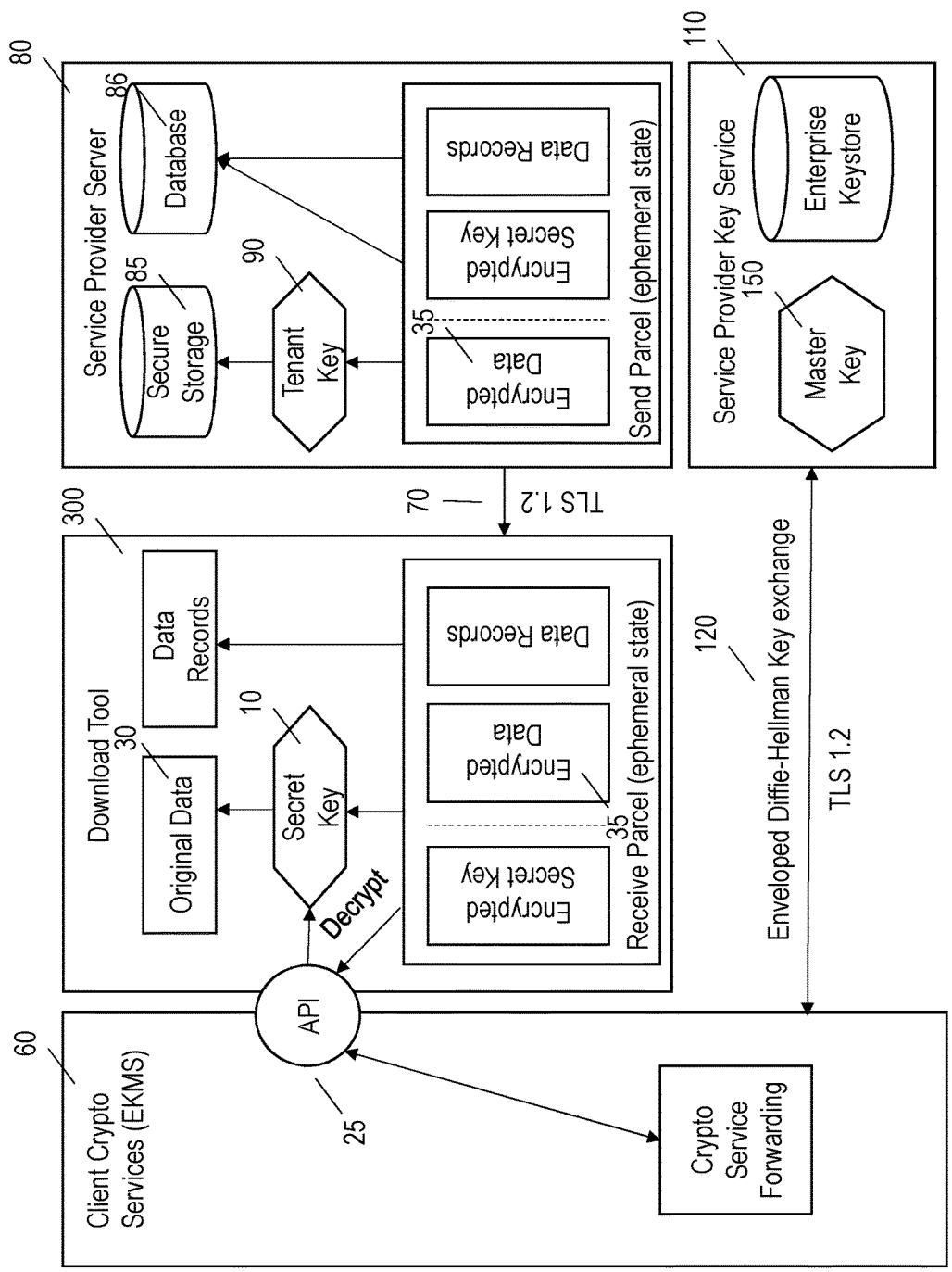
FIG. 4 illustrates an alternate exemplary system architecture diagram for decrypting data according to the technology of the present application.

FIGS. 3 and 4 illustrate how the systems of FIGS. 1 and 2 respectively may be employed to retrieve and decrypt a voice recording for playback. As illustrated in FIGS. 3 and 4, the client 60 (FIGS. 1 and 2) is replaced by Download tool 300. Those skilled in the art will recognize that while Download tool 300 is illustrated as a standalone element of the system, it may be part of the client 60, it may be co-located with the client application or it may be located on an entirely different machine than the client 60. As also illustrated in FIGS. 3 and 4 the system for the downloading tool mirrors the encryption system.

Figure 6:
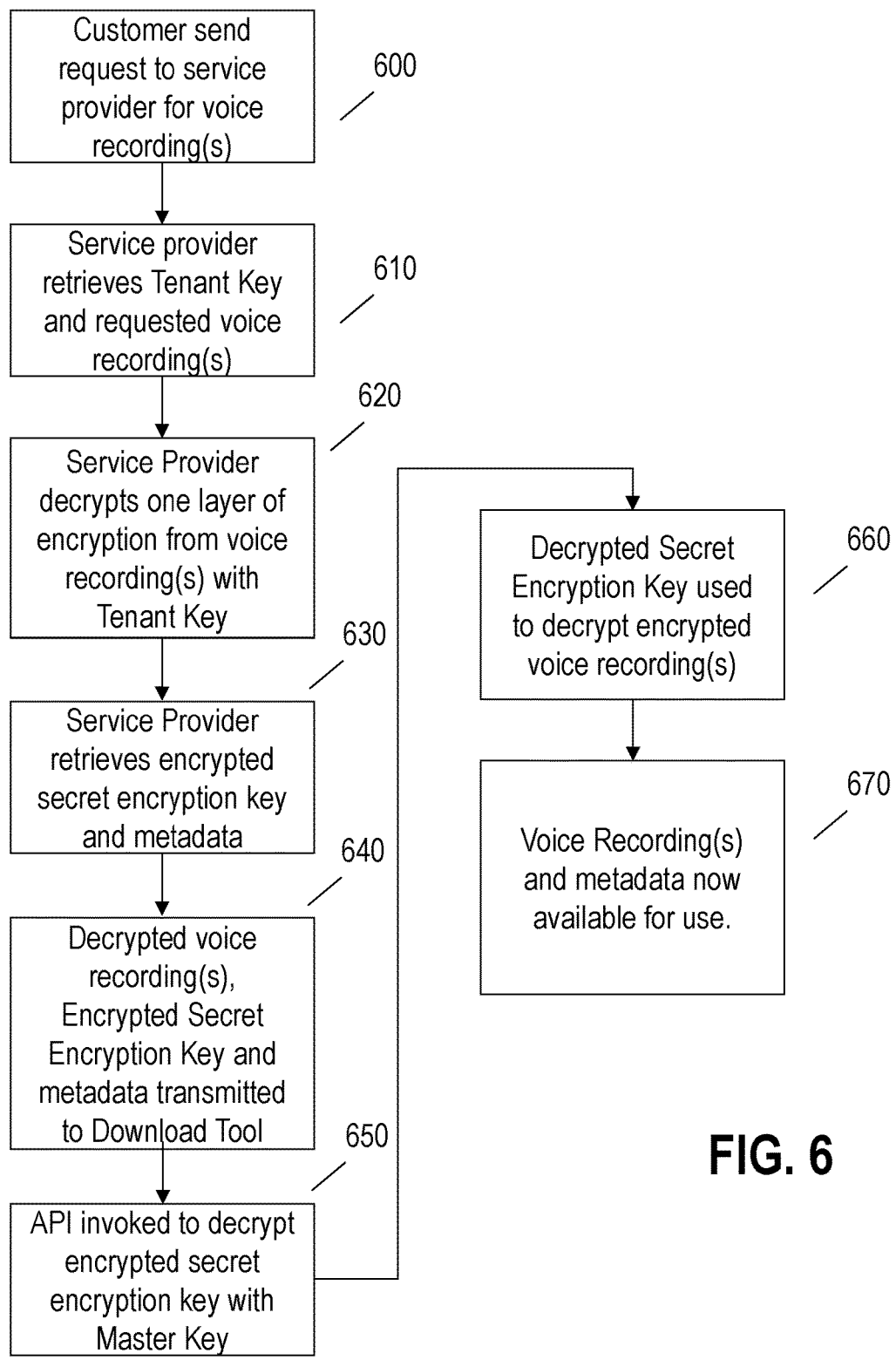
FIG. 6 illustrates a flowchart of an exemplary method of decrypting data in accordance with the technology of the present application.

FIG. 6 provides a flow chart illustrating generally how to retrieve an encrypted voice recording for playback. A client transmits a request to the service provider's server for voice recording(s) 600. The service provider server accesses the requested encrypted voice recording from the secure storage and the associated tenant key from the database and decrypts the first layer of encryption from the voice recording(s) with the tenant key placing the voice recording into an ephemeral state 610. The service provider retrieves the associated encrypted secret key and metadata from the database 620. The decrypted recording(s) (which are still encrypted with the secret key encryption), the encrypted secret key (which is still encrypted with the master key), and metadata are then transmitted to the customer (download tool) over a TLS 1.2-mediated connection 630. Those skilled in the art will recognize that while preferred, it is not required that the transmission line be a secure transmission line due to the encrypted nature of the data. An API is invoked to decrypt the encrypted secret key with the client's master key 640 and the resulting decrypted secret key is employed by the download tool to decrypt the voice recording 660. The voice recording and associated metadata are now available for use by the client 670.

Figure 7:
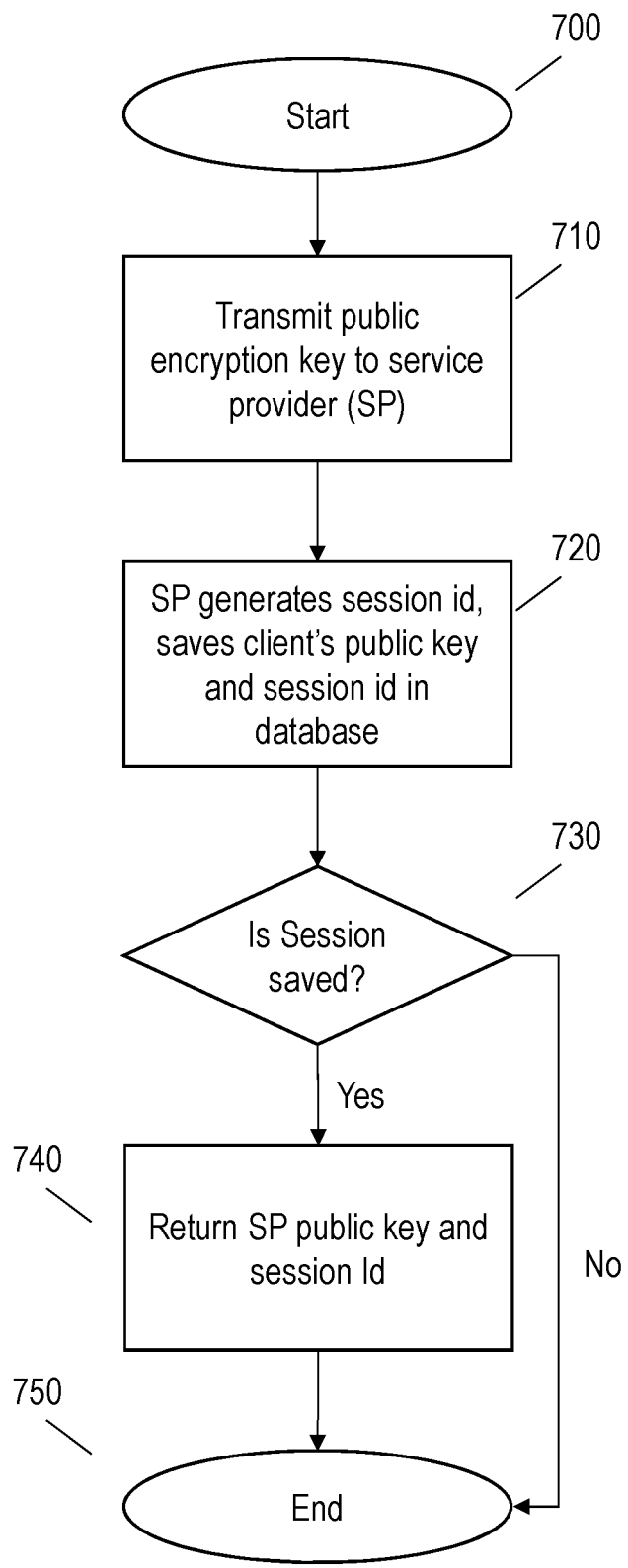
FIG. 7 illustrates a flowchart of an exemplary method of validating a session according to the technology of the present application.

While preferred but not required, communications between the client/download tool and the service provider may be initiated with an exchange of public keys for communication encryption (FIG. 7). In such a configuration, the session is started 700. The client/download tool provides a public key to the service provider 710. The service provider generates a session identification (id) and stores the public key and session id 720. The service provider also confirms that the session has been stored 730. If storage is confirmed, the service provider returns a service provider public key and the session id to the client/download tool 740 and ends the public key exchange 750, otherwise the session ends without the service provider returning the public key or the session id 750. Once the handshake is successful, a session is started. The duration of the session is a design choice. It may have a time limit such as 20 minutes, more than 20 minutes, less than 20 minutes or it may simply end when the client decides to end the session.

Figure 8:
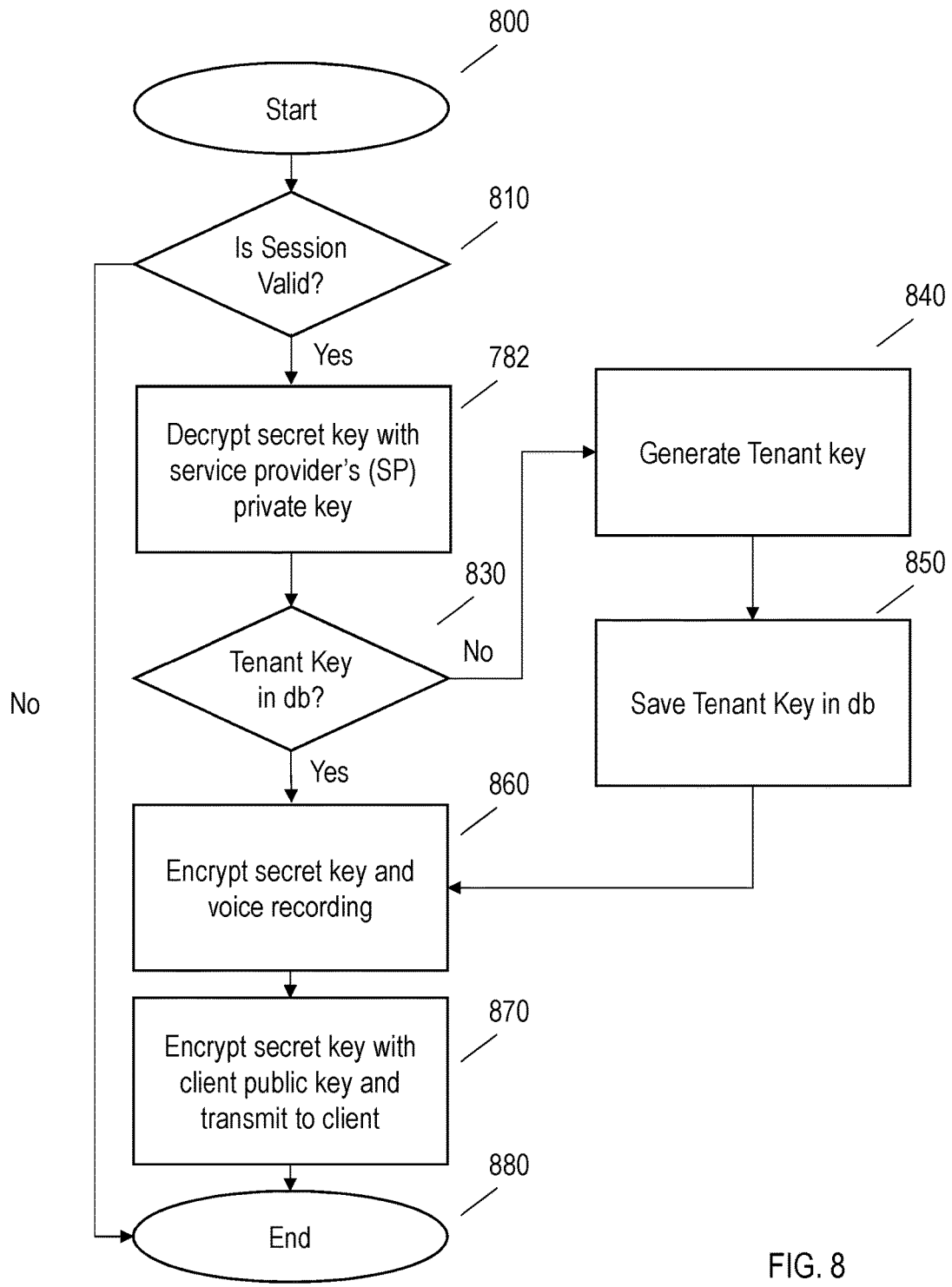
FIG. 8 illustrates a flowchart of an alternate exemplary method of encrypting data according to the technology of the present application; and, FIG. 9 illustrates a flowchart of an alternate exemplary method of decrypting data according to the technology of the present application.

As illustrated in FIG. 8, once the exchange of encryption keys is completed a recording session may begin 800. The client encrypts the secret encryption key with the service provider's public key. The service provider receives a session id the encrypted secret key and the encrypted voice recording and determines if the id is valid 810. If it is not valid then the session ends 880. If valid, the service provider decrypts the secret encryption key that it receives from the client with the service provider's private key 820. The service provider then determines if it has a tenant key for the client 830. If no tenant key exists, the service provider generates a tenant key 840 and stores the tenant key 850. Once the tenant key exists, the secret key and the data record may be further encrypted before storing the same 860. In a preferred configuration, the secret key is encrypted with the tenant key and the voice recording is encrypted with the client's public key, although those skilled in the art will recognize that the key used to encrypt the secret key and the voice recording at the service provider is a design choice and may be the same key or different keys. The secret key which has been encrypted with the tenant key (or some other key) may be further encrypted with the client's public key and returned to the client for storage 870 at which point the session ends 880. Those skilled in the art will recognize that the service provider may store the voice recording and the secret encryption key without further encrypting one or both of these elements and may or may not return the encrypted secret key to the client for storage and still fall within a scope of one or more of the claims.

Figure 9:
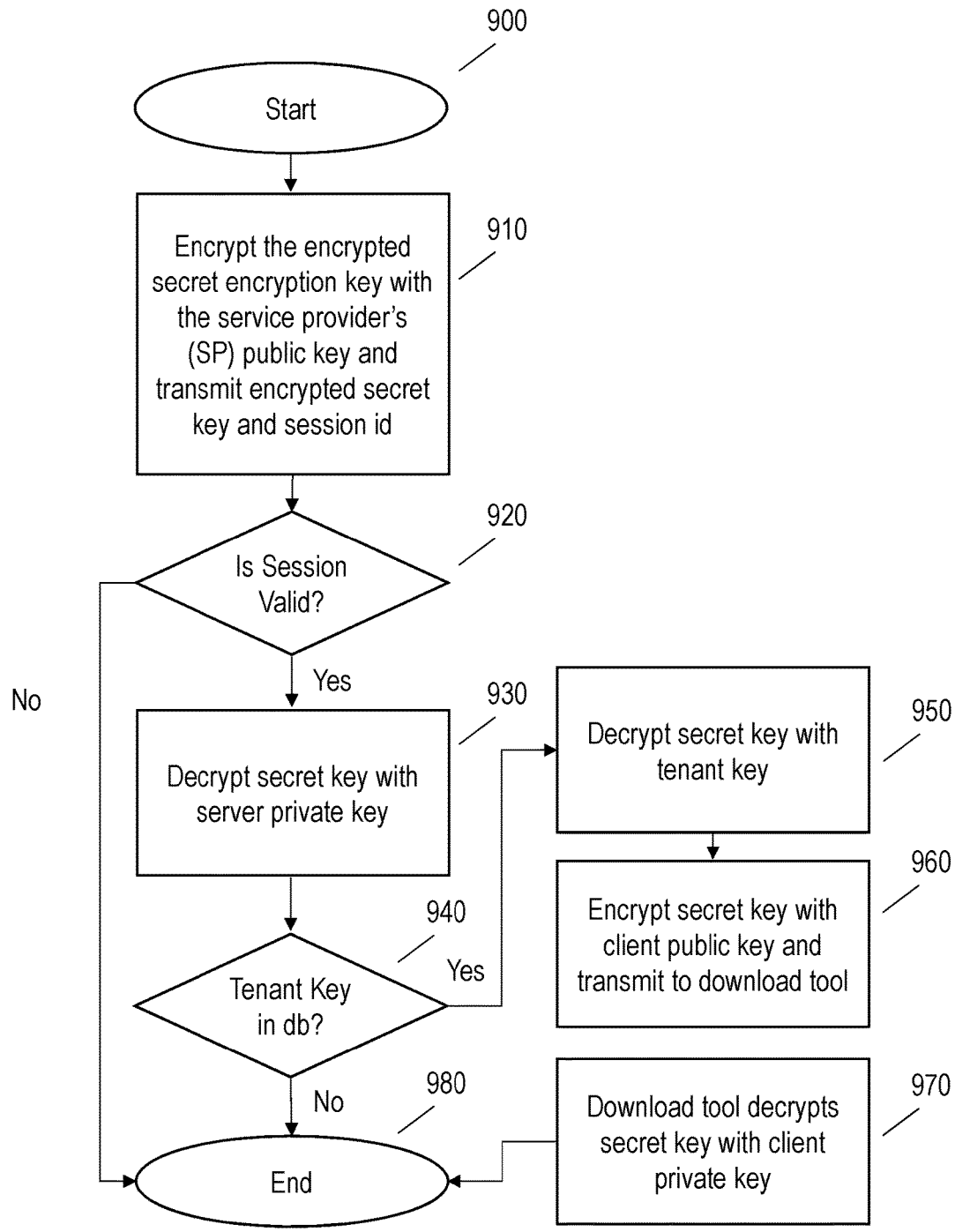

As illustrated in FIG. 9, once the exchange of encryption keys is completed a download session may begin 900. The client/download tool encrypts the secret encryption key with the service provider's public key and sends the encrypted secret key and the session id 910. The service provider determines if the id is valid 920 and if so decrypts the secret key with the service provider's private key 930. If it is not valid then the session ends 980. If valid, the service provider determines if the tenant key is stored 940. If the tenant key is not stored, then the session ends 980. If the tenant key is available, then the service provider retrieves the tenant key and decrypts the secret key with the tenant key 950. The secret key is then encrypted with the client's public key (or appropriate public key if the download tool is located on a different machine from the client application) and transmitted to the download tool 960 which then decrypts the secret key with the client private key (or appropriate private key) 970 at which point the transfer ends 980 and the appropriate further processing (as discussed above) may be performed.

Having thus described preferred embodiments of the invention, advantages can be appreciated. Variations from the described embodiments exist without departing from the scope of the invention. For example, the system could also employ tokens to further secure the data, and/or the system could employ tokens to secure a copy of the encryption keys in the event that the original encryption keys somehow get corrupted or lost. Thus it is seen that systems and methods are provided for encrypting data at a customer for storage at a hosted service provider. Although particular embodiments have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the invention as defined by the claims. Other aspects, advantages, and modifications are considered to be within the scope of the following claims. The claims presented are representative of the inventions disclosed herein. Other, unclaimed inventions are also contemplated. The inventors reserve the right to pursue such inventions in later claims.

Insofar as embodiments of the invention described above are implemented, at least in part, using a computer system, it will be appreciated that a computer program for implementing at least part of the described methods and/or the described systems is envisaged as an aspect of the invention. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall there between.

Having described the invention, what is claimed as new and secured by Letters Patent is:

1. A system for secure storage of customer data by a remote service provider equipment (SPE), said system comprising:
    a processor based customer premise equipment (CPE);
        said CPE having an application programming interface (API) and a key manager;
    said CPE configured to generate a secret encryption key;
    said key manager is configured to provide a master encryption key to said API for encrypting said secret encryption key;
    said CPE is also configured to generate a data, and encrypt said data with said secret encryption key, to encrypt said secret encryption key with said master encryption key and to transmit said encrypted data and said encrypted secret encryption key for receipt and storage by said service provider.

2. The system according to claim 1 wherein said data includes a voice recording.

3. The system according to claim 1 further comprising a download tool configured to recall said data from said service provider and decrypt said recalled data for playback.

4. The system according to claim 3 wherein said download tool is further configured to receive said secret encryption key and decrypt said secret encryption key with said master key.

5. The system according to claim 1 wherein said CPE is further configured to receive a service provider public encryption key (PK) and to encrypt said encrypted data and said encrypted secret encryption key with said PK prior to said transmission of said encrypted data and said encrypted secret encryption key.

6. A method for storing customer data at a remote service provider, said method comprising:
    a customer accessing via a processor based device a service provided by said service provider;
    said customer generating data as a result of said access;
    said processor based device generating a secret encryption key;
    said processor based device encrypting said data with said secret encryption key and transmitting said encrypted data for receipt by said service provider;
    said processor based device encrypting said secret encryption key with a master encryption key; and,
    said processor based device transmitting said encrypted secret encryption key for receipt by said service provider.

7. The method according to claim 6 wherein said CPE generates said master encryption key.

8. The method according to claim 6 wherein said CPE receives said master key from the service provider.

9. The method according to claim 6 wherein said CPE receives said master key from a third party.

10. The method according to claim 6 further comprising said SPE receiving said encrypted data and said encrypted secret encryption key and further encrypting said encrypted data with a tenant encryption key; and,
    said service provider storing said further encrypted data and said tenant key in a storage.

11. The method according to claim 10 further including said SPE further encrypting said encrypted secret encryption key and storing said encrypted secret encryption key in another storage which is separate from said storage.

12. The method according to claim 10 further including said SPE further encrypting said encrypted secret encryption key and transmitting said further encrypted secret encryption key for receipt by said CPE.

13. The method according to claim 6 further comprising said SPE receiving said encrypted data and said encrypted secret encryption key, further encrypting said encrypted secret encryption key with a tenant encryption key and further encrypting said encrypted data with a CPE public key; and,
   said SPE storing said further encrypted data and said further encrypted secret encryption key in physically separate storage devices.

14. A method for storing at a service provider customer data, said method comprising:
   said service provider receiving an encrypted secret encryption key and an encrypted data from a processor based customer equipment running an application provided by said service provider, said data being encrypted with said secret encryption key;
   said service provider further encrypting said encrypted data and storing said further encrypted data in a storage device; and,
   said service provider further encrypting said encrypted secret encryption key.

15. The method according to claim 14 wherein said further encryption of said data is with a customer provider public encryption key and said further encryption of said encrypted secret encryption key is with a tenant encryption key.

16. The method according to claim 14 wherein said further encryption of said data is with a tenant encryption key and said further encryption of said encrypted secret encryption key is with a customer provided public encryption key.

17. The method according to claim 14 further including said service provider storing said further encrypted secret encryption key in a storage which is separate from said storage containing said further encrypted data.

18. The method according to claim 16 further including said service provider transmitting said further encrypted secret encryption key for receipt by said customer.

19. The method according to claim 16 wherein said data is a voice recording.

20. The method according to claim 15 wherein said tenant encryption key is stored separate from said further encrypted secret encryption key.

* * * * *